H. P. HENRIKSEN.
Glove-Sewing Machine.

No. 215,615. Patented May 20, 1879.

6 Sheets—Sheet 5.

H. P. HENRIKSEN.
Glove-Sewing Machine.

No. 215,615.  Patented May 20, 1879.

Witnesses
Fred. G. Dieterich
Jno. A. Madigan

Inventor
Hans P. Henriksen
by Louis Bagger & Co.
his Attorneys.

N. PETERS, PHOTO-LITHOGRAPHER, WASHINGTON, D. C.

6 Sheets—Sheet 6.

H. P. HENRIKSEN.
Glove-Sewing Machine.

No. 215,615. Patented May 20, 1879.

Witnesses
Fred G. Dieterich
Jno. B. Madigan

Inventor
Hans P. Henriksen
by Louis Bagger & Co.
his Attorneys.

N. PETERS, PHOTO-LITHOGRAPHER, WASHINGTON, D. C.

UNITED STATES PATENT OFFICE.

HANS P. HENRIKSEN, OF COPENHAGEN, DENMARK, ASSIGNOR OF ONE-HALF HIS RIGHT TO LOUIS BAGGER, OF WASHINGTON, DISTRICT OF COLUMBIA.

IMPROVEMENT IN GLOVE-SEWING MACHINES.

Specification forming part of Letters Patent No. 215,615, dated May 20, 1879; application filed December 2, 1878.

*To all whom it may concern:*

Be it known that I, HANS P. HENRIKSEN, of the city of Copenhagen, in the Kingdom of Denmark, have invented certain new and useful Improvements in Glove-Sewing Machines; and I do hereby declare that the following is a full, clear, and exact description of the invention, which will enable others skilled in the art to which it appertains to make and use the same, reference being had to the drawings hereto annexed, which form a part of this specification, and in which—

Figure 1:
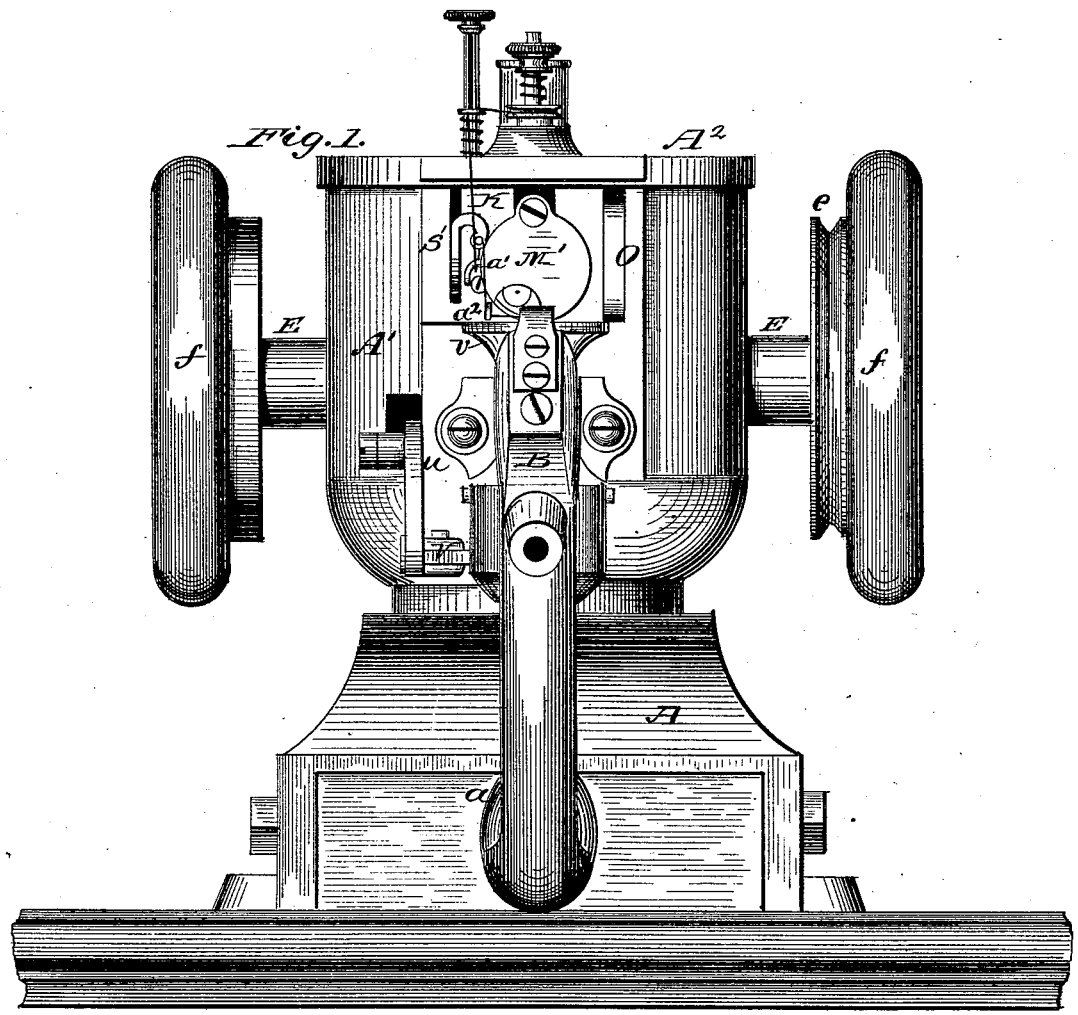
Figure 2:
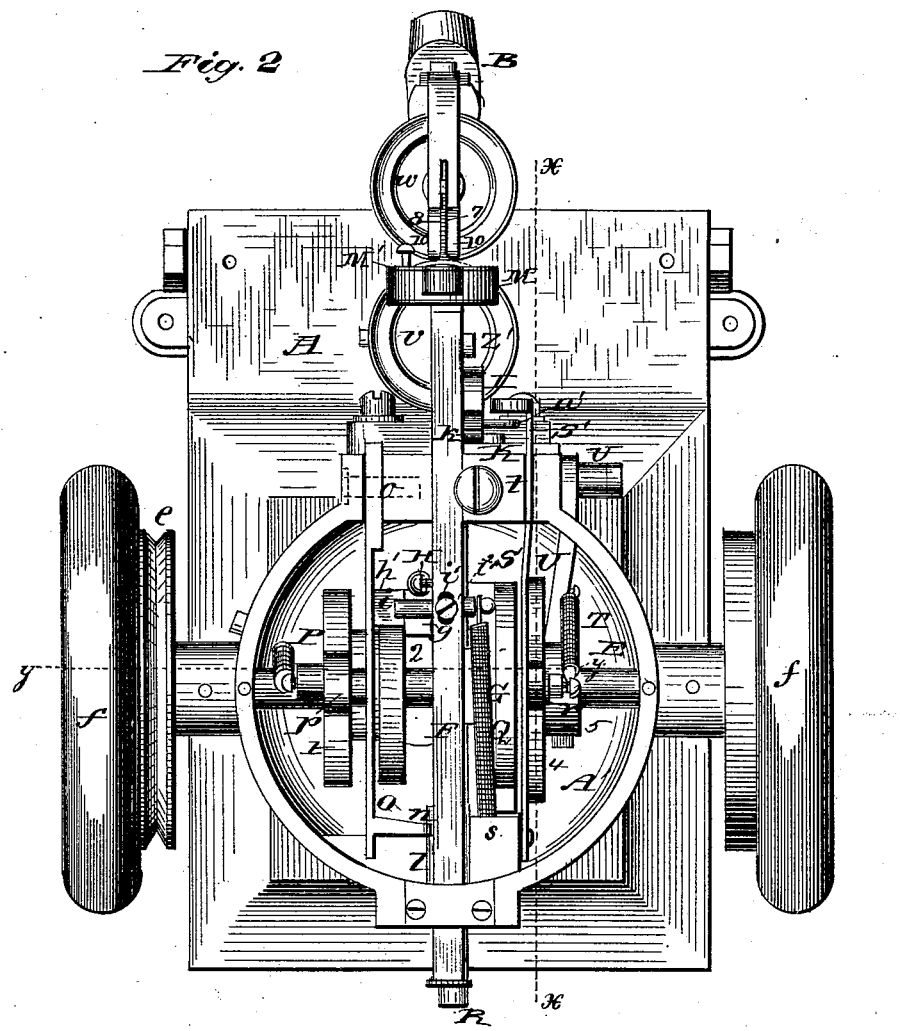
Figure 3:
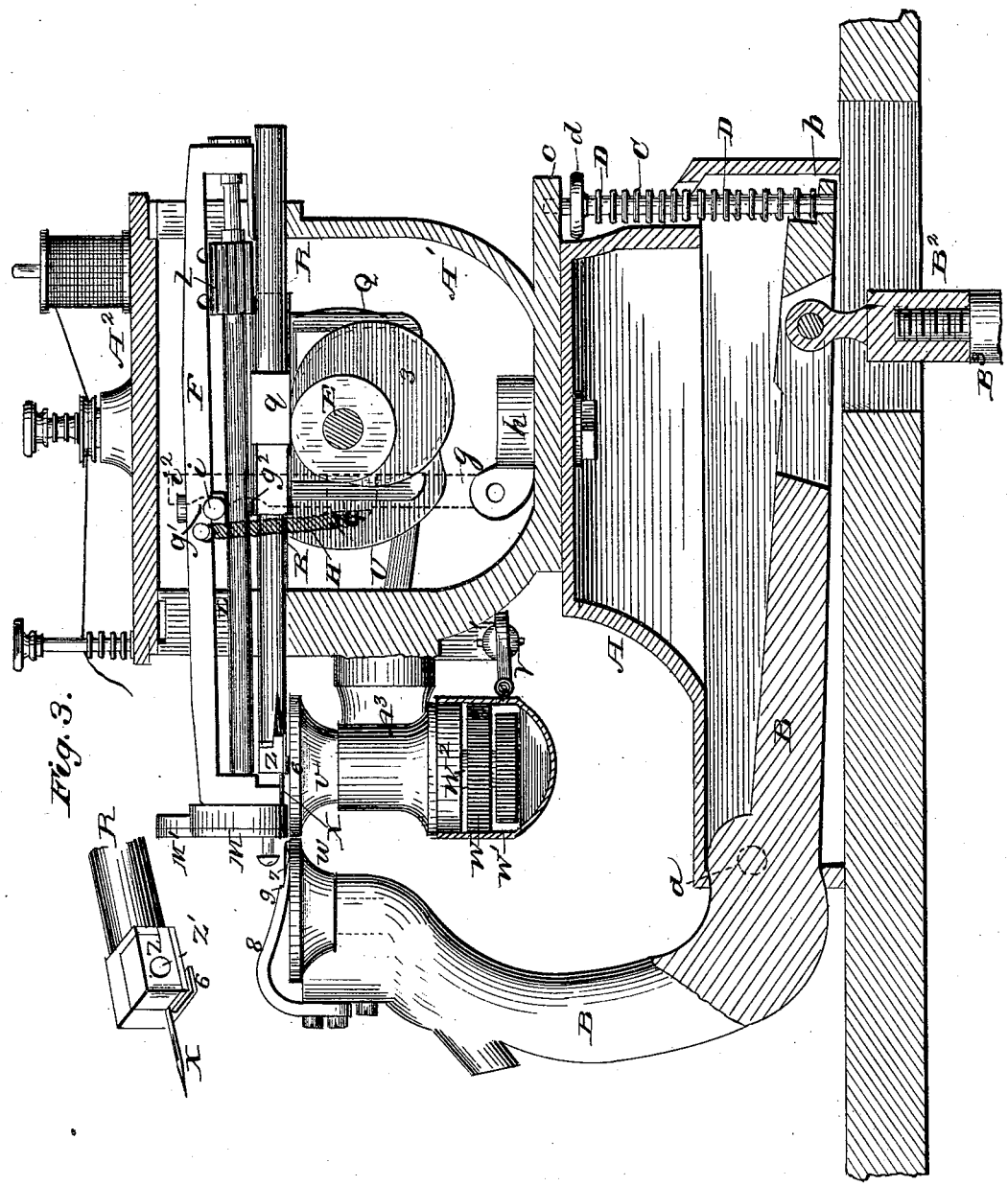
Figure 4:
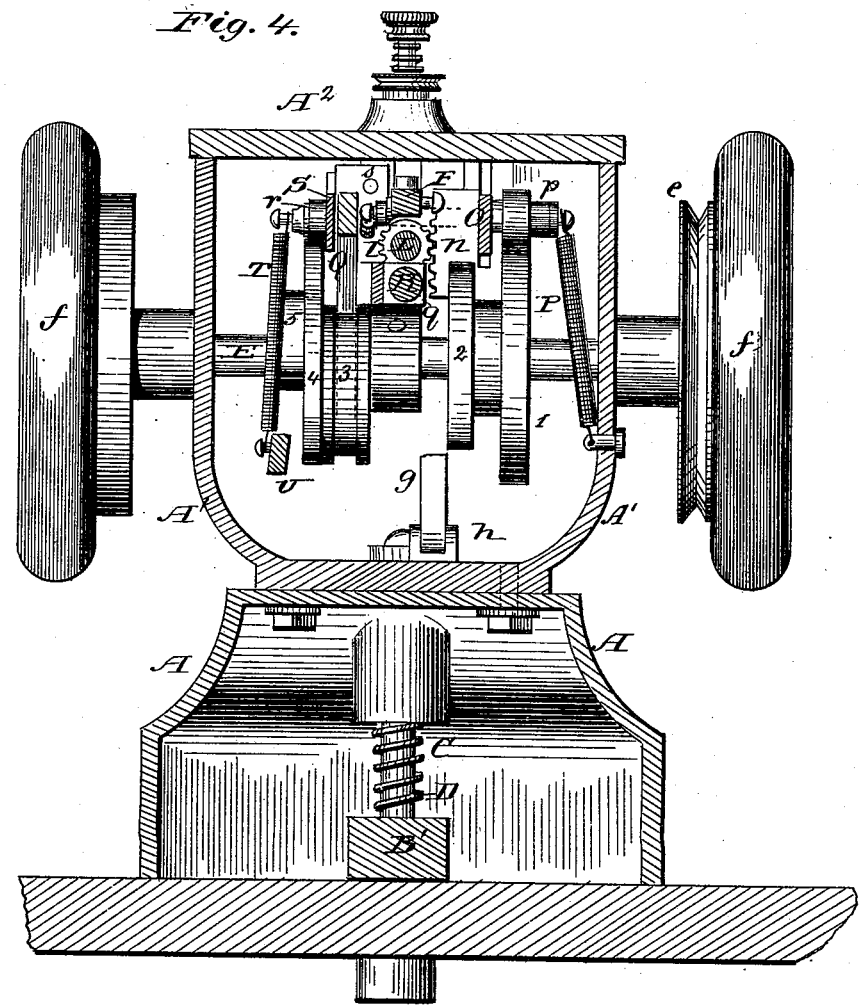
Figure 5:
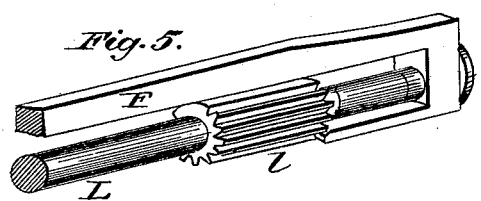
Figure 6:
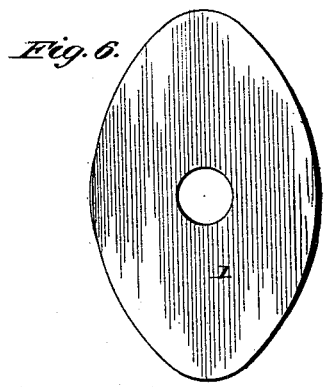
Figure 7:
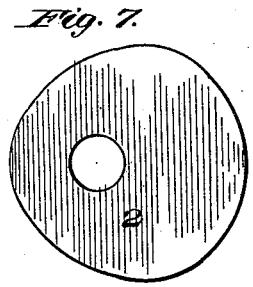
Figure 11:
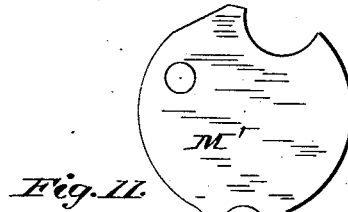
Figure 12:
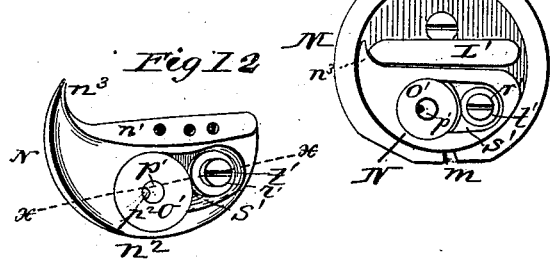
Figure 13:
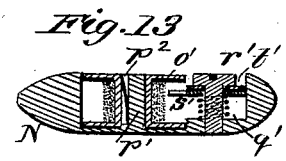
Figure 14:
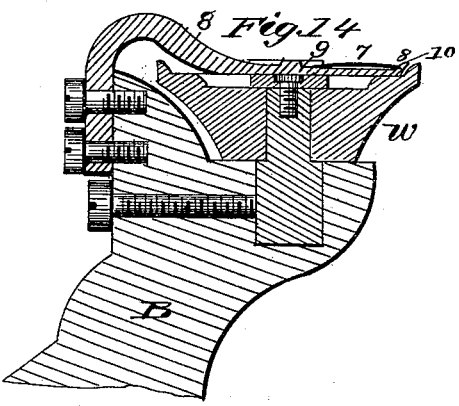
Figure 16:
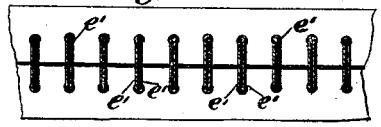
Figure 15:
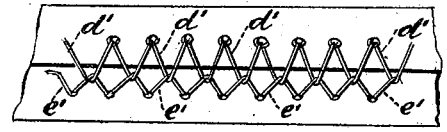

Figure 1 is a front elevation. Fig. 2 is a top view, the cap or covering plate having been removed to show the operating mechanism. Fig. 3 is a sectional side elevation of the machine on the line indicated by $x$ $x$ in Fig. 2. Fig. 4 is a sectional rear elevation on line $y$ $y$, Fig. 2. Fig. 5 is a detail view of the rear end of the reciprocating and oscillating shuttle-bar and shaft. Figs. 6, 7, 8, 9, and 10 are side views of the several cams for operating the several working parts of the machine. Fig. 11 is a face or front view of the shuttle-carrier open, with the shuttle in position for operation. Fig. 12 is a perspective view of the shuttle on an enlarged scale. Fig. 13 is a cross-section of the shuttle on the line $x$ $x$, Fig. 12, showing its bobbin, tension-plate, spring, and tension-screw. Fig. 14 is a sectional view, on an enlarged scale, of the exterior intermittently-rotating feed-disk, showing its spring or cushion for receiving and guiding the point of the needle. Fig. 15 is a top or face view, on an enlarged scale, of the stitch made by my machine; and Fig. 16 is a back view of the same.

Similar letters of reference indicate corresponding parts in all the figures.

My invention relates to that class of sewing-machines which are adapted more particularly for the sewing of gloves; but its construction is such that it may also be used with advantage for other purposes, such as the sewing of hosiery, under-garments, uppers of boots and shoes, furs, and, in fact, for all purposes where it is desired to obtain a strong yet elastic lock-stitch, capable of making a perfectly smooth and flat seam, without overlapping of the edges of the pieces of material to be united.

To this end my invention consists, broadly, in the combination of a shuttle having a complex or double reciprocating and oscillating motion with a horizontally-reciprocating needle, and in the construction and combination of parts for operating the shuttle, needle, feed, and take-up, as well as in the combination, with the reciprocating needle and oscillating shuttle, of a spring-cushion, which is to receive and guide the needle as it enters or crosses the periphery or rim of the intermittingly-rotating presser-foot disk, all as hereinafter more fully described, and pointed out in the claims.

Referring to the drawings hereto annexed, which illustrate my invention, A is a cast-iron box or standard, supporting the casing $A^1$, which contains and protects the operating mechanism, and is closed by a cap or cover, $A^2$, on which the customary tension devices for the needle-thread and the post for its spool are arranged.

The base-piece or standard A, which is securely screwed to a table or other suitable support, has hinged to its front side, at $a$, the presser foot or arm B, which is in the shape of a bell-crank lever, the long arm $B^1$ of which extends into the standard A underneath case $A^1$, having a perforation, $b$, at its extreme rear end, through which passes the bottom end of the vertical tension screw or pin C, the upper end of which is screwed into a lug or bracket, $c$, projecting rearward from case $A^1$.

The tension of the coiled spring D, which encircles screw C, may be adjusted by means of the screw-button $d$, against the under side of which spring D bears at its upper end, while at its lower it abuts against the rear end of arm $B^1$, so that by this arrangement of parts the upright presser-arm B, which carries the presser-disk $w$, will be forced against the feed-disk $v$ with a pressure that may be regulated by adjusting the tension-button $d$ according to the nature or thickness of the material which is fed between the two disks $v$ and $w$.

Near to the rear end of arm $B^1$ is pivoted a socket-piece, $B^2$, into which is screwed the upper end of a rod, $B^3$, which passes through a perforation in the table, and is connected at its other end to a treadle-lever, by means of which the presser-arm B, with its disk $w$, may be thrown out from contact with the feed-disk $v$ when it is desired to insert, withdraw, or change the position of the fabric operated upon.

That part of the mechanism which is contained within the casing $A^1$ is operated by a single shaft, E, having one or more exterior pulleys, $e$, and fly-wheels, $f$. Keyed or otherwise firmly secured upon this shaft are five cams, (denoted, respectively, by the numerals 1, 2, 3, 4, and 5, and shown detached from the shaft and placed side by side in Figs. 6, 7, 8, 9, and 10 on Sheet 5 of the drawings.) The first of these cams, 1, is elliptical in shape, and serves, by the intermediate mechanism, to be hereinafter described, to impart an oscillating motion to the shaft or axle which operates the shuttle-carrier. Cam 2 serves to impart a reciprocating motion to the shuttle-bar F by means of the following mechanism: $g$ is an upright lever, pivoted in a bearing, $h$, screwed into the bottom of case $A^1$, and having two notches or recesses, $g^1$ $g^2$, at its upper end. Into either of these notches will fit a pin, $i$, which is secured adjustably to the under side of bar F by means of a slot, $i^1$, in the bar and the set-screw $i^2$. Projecting laterally from the upright lever $g$ is a lug or tappet, $h'$, which is forced to bear against the periphery of cam 2 by a coiled spring, G, secured at one end in the wall of case $A^1$, and hung at the other end in a knob formed upon pin $i$, opposite to that side or end of this pin which bears against lever $g$, so that spring G, as will be readily seen, serves the double purpose of keeping the lug $h'$ of lever $g$ always in contact with or bearing against the periphery of cam 2, and of pulling the shuttle-bar F back after its forward throw at each reciprocating movement.

The throw of bar F may be adjusted by means of the set-screw $i^2$.

H is another coiled spring, which connects the lever $g$ with bar F. A complex motion is imparted to this bar by means of the notched bracket I, which is secured upon and projects from a plate, K, attached to the face of casing $A^1$. Upon this notched bearing slides a pin or roller, $k$, which projects laterally from bar F, and is kept in contact with the notched upper side or face of bearing I by means of the tension-spring H.

Thus it will be seen that by the operation of cam 2, lever $g$, the coiled springs G and H, and the notched bearing I, a reciprocating jumping motion is imparted to the shuttle-bar F; in other words, this will not move in a straight line forward and back, but in an arc, the length of which may be regulated by adjusting set-screw $i^2$, the height of which corresponds to the distance between the highest point or rise of bearing I and the bottom of its curves or notches.

Bar F is bent downward at each end to form boxes or bearings for a shaft, L, arranged parallel with said bar, upon the forward end of which shaft, projecting into the shuttle-carrier M, is secured a cross-piece, L', in such a manner that one side or edge of the piece L' will cross diametrically through the center-line of shaft L. In this manner the shuttle-carrier M is divided into two unequal parts, in the larger one of which the shuttle N, to be hereinafter described, is placed. The carrier M, which is of circular shape and has a hinged cover, M', is screwed upon the forward downwardly-bent end of bar F, as shown, and has a slot, $m$, in its under side for the passage of the thread from the shuttle.

An oscillating motion is imparted to the shaft L and shuttle-driver L' by means of a toothed cylinder, $l$, secured upon the rear end of the shaft L. This cylinder engages with a rack, $n$, secured at right angles to and upon one end of a lever, O, the other end of which lever is pivoted at $o$ in a vertical slot in the front side of case A', while its extreme rear end, back of the laterally-projecting rack $n$, moves in a vertical guide-slot in the rear part or wall of case $A^1$, so as to prevent any lateral play or oscillation of the lever O. Projecting from one side of this lever is a pin, which carries a roller, $p$, that is kept in contact with the periphery of the elliptical cam 1, to which reference has already been made, by means of the coiled spring P.

It will thus be seen that by the combination and arrangement of the cams 1 and 2, levers $g$ O, coiled springs G H P, and bar F, with its parallel shaft L, a compound or complex motion is imparted to the shuttle-driver L'—viz., a reciprocating jumping motion and an oscillating or rotary reciprocating motion, both of which movements are simultaneous and lie in planes at right angles to each other.

Cam No. 3 is placed between the arms of a U-shaped piece, Q, which is secured by a cross-arm, $q$, upon one side of the needle-bar R, to which a plain reciprocating motion is thus imparted by the revolutions of shaft E.

Figure 8:
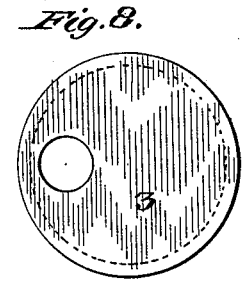

To prevent lateral motion of the forked piece Q, cam No. 3 is preferably provided with guide-flanges on each side, as indicated in Fig. 4, and also by the dotted lines in Fig. 8.

Figure 9:
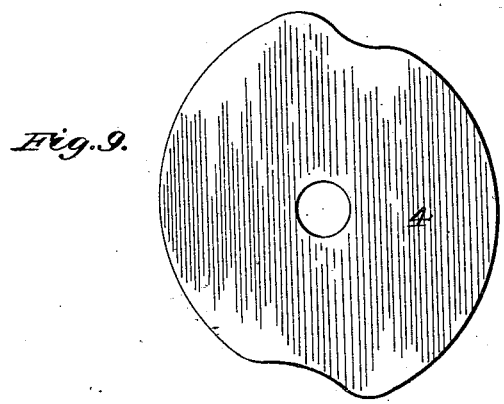

Cam No. 4, which is of the peculiar shape represented in Fig. 9, operates the take-up device substantially by the same means by which cam No. 1 operates lever O—that is, it engages with a friction-roller, $r$, projecting from one side of a lever, S, pivoted in a block, $s$, in the rear wall of case $A^1$, the roller $r$ being kept in contact with the periphery of cam 4 by means of the coiled spring T, the opposite or lower end of which is secured upon the long arm of the bell-crank lever U, to be hereinafter described. The forward end, S', of the vibrating lever S, which projects outside of case $A^1$ through the vertical guide-slot $t$, forms the take-up hook for taking up the slack of the needle-thread.

Figure 10:
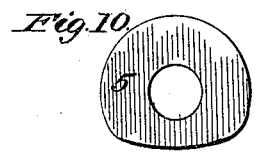

The last cam, No. 5, which is of the configuration shown in Fig. 10, serves to operate the feed by working against the long arm of the bell-crank lever U, referred to above, which has its fulcrum at $u$, and the short arm of which carries an adjustable spring-pawl, V, which engages with either one of a series of notched wheels, W $W^1$, of different diameters, secured horizontally upon a vertical shaft, $W^2$, which passes through a bracket, $A^3$, projecting from case $A^1$, and carries upon its upper end the feed cup or disk $v$, to which an intermittent rotary motion is thus imparted.

Upon the upper end of the presser-arm B, which has already been described, is pivoted, horizontally and centrally, a corresponding cup or disk, $w$, the serrated or milled rim of which is pressed against the serrated or milled rim of the feed-disk $v$, or against the material inserted between the two rims, by the tension of the adjustable spring D, so that an intermittent rotary motion will be imparted by the friction to disk $w$, regulated by and corresponding to the motion of the feed-disk $v$.

The needle X is inserted into the projecting front end of the needle-bar R, where it is held firmly in place by means of a clamp-piece, Z, and set-screw $Z'$. Extending laterally under the clamp-piece Z is a guide-piece, 6, through which the needle-thread is passed previous to its insertion into the eye of the needle, as hereinafter described. As the point of the needle, after passing through the material operated upon, crosses the rim of the presser-disk $w$, it is received upon a guide-cushion, which consists of a fine spring, 7, resting in a groove of the toe-piece 8, which toe-piece consists of a bent piece, the short arm or heel of which is screwed upon the front or face of presser-arm B, while its long arm or shoe projects over and diametrically across the presser-disk $w$, as shown more clearly in Figs. 2 and 14 of the drawings. This upper piece has a step, as at 9, with a recess for the insertion of the guide-spring 7, the other end of which is bent slightly downward and rests between the toes 10 10 of the shoe-piece 8, which prevent its lateral displacement by its intermittent contact with the reciprocating needle. In this class of machines the needle must be adjusted with great nicety, owing to the fine nature of the work, and by means of the spring-cushion 7 the needle-point is at all times carried in the exact direction in which it is to go, and sufficiently close up under the shuttle to avoid the "dropping" of stitches on the forward throw of the needle and shuttle.

The configuration and construction of the shuttle will be understood by reference to Figs. 12 and 13 on Sheet 6 of the drawings, from which it will be seen that it consists of a boat-shaped piece, having a straight or flat side, $n^1$, and a curved or segmental side, $n^2$, forming the arc of a circle of a radius corresponding to that of the interior of the circular carrier M in which the shuttle is placed. At one end is a hook, $n^3$, and in its straight edge is a series of perforations for the passage of the thread from the bobbin $o'$, which revolves upon a pin in the center of a circular recess in the body of the shuttle, said pin or pivot $p^1$ being provided with a tension-spring, $p^2$, for preventing the bobbin from turning too fast. At one side of the cylindrical recess for receiving the bobbin is another smaller recess, of a horseshoe form, in which is placed a small coiled spring, $q'$, encircling a tension-screw, $r'$, which passes through a lower horseshoe-shaped tension-plate, $s'$, resting with its lower side upon the spring $q'$, and an upper annular plate, $t'$, between which two plates, $s'$ and $t'$, the thread from the bobbin is inserted previous to its being carried out through the perforations in the flat side of the shuttle. This tension device may be adjusted by turning the tension-screw $r'$.

Having now fully described the construction of my machine, I shall proceed to describe its operation. The two pieces of skin or other material or fabric to be united are first placed one upon the other, their inner sides facing each other, with their edges flush or even with each other, and are then inserted between the feed-disks $v$ and $w$, which are for that purpose separated from each other by pressure upon the treadle which operates lever-arm $B^1$, as already described in the first part of this specification.

The depth of the seam from the edges of the material will depend upon the position of the fabric relative to the feed-disks—i. e., the distance which the edge projects up over the rims of these disks; and it is obvious that by simply doubling the material this machine may be used in like manner for ornamental or ridge sewing, or for hemming, or for a variety of other purposes.

Previous to the insertion of the fabric between the feed-disks, the machine should be threaded by winding and inserting the bobbin in the shuttle and arranging the thread in the tension device in the manner described, after which the shuttle is inserted into the larger of the two recesses in the shuttle-carrier formed by the driver $L'$, the thread being pulled out through the slot $m$ in carrier M, and its end carried down between the two feed-disks.

The needle is threaded by carrying the thread from the spool, which is placed upon a post on the cover $A^2$ of case $A^1$, through the tension devices in the usual manner, and down around a hook, $a^1$, Fig. 1, then up through the eye in the take-up hook $S'$, down again under the hook $a^2$, across disk $v$, and into the slot formed between the under side of the needle-bar R and the guide-piece 6, then along the groove in the under side of the needle, and up through its eye, which is threaded from below. The fabric to be sewed is then inserted between the feed-disks in the manner described, and the machine is ready to work, the motive power being supplied by an endless band and pulley, operated by a fly-wheel, pitman, and treadle, as usual in sewing-machines; or it may be run by steam, water, compressed air, or any other suitable motive power adapted to this class of machines.

The stitch, the construction and appearance of which will be understood by reference to Figs. 15 and 16, is formed in the following manner: The needle, perforating the material horizontally and at a right angle thereto, carrying the thread with it, crosses from disk $v$ to disk $w$, where it is received upon and guided by the spring-cushion 7. At the point where it has reached the end of its forward throw or motion, it is met by the descending oscillating shuttle, which catches in between the needle and upper thread, carrying its thread $d'$ under the needle-thread $e'$, while the latter is slack and commencing its double return motion—that is, reversing its oscillation within carrier M simultaneous with the retrograde movement of the said carrier itself, within which it is inclosed—at the time the take-up hook $S'$ is at its highest point, and the needle-thread consequently tightened. At the end of the stroke of the needle on disk $v$ this operation is repeated, so that two loops or locks are formed at each stitch, one on each side of the seam, by which a zigzag or cross stitch, formed by the thread $d'$ crossing from one side to the other, is formed upon one side of the material or fabric, as shown at Fig. 15, and a series of crosswise parallel double-thread stitches on the opposite side, as shown in Fig. 16. The seam thus formed is not only very ornamental, (especially if thread of different colors be used,) but exceedingly strong, and yet very elastic, so that it may readily be flattened out by simply pulling the two pieces of fabric in opposite directions until their edges shall be perfectly flat and flush with each other, merely impinging upon, but not overlapping, each other, as seen in Figs. 15 and 16 of the drawings.

The shuttle-bar F, with its carrier M, may be raised from the work, when it is desired to inspect the same, by lifting it up so that the pin $i$ will slip into the upper notch, $g^2$, in the operating-lever $g$.

It is obvious that details in the construction and arrangement of parts of my machine may be changed or modified to adapt it better for the different purposes for which it is capable of being used without deviating from the spirit of my invention. Thus, for instance, when intended for leather, in the manufacture of uppers for boots and shoes, some of the parts should be made heavier than it is necessary to have them in a machine which is intended for the sewing of gloves only.

Having thus described my invention, I claim and desire to secure by Letters Patent of the United States—

1. In a sewing-machine, the combination of a horizontally-reciprocating needle, and a shuttle set above and at right angles to the needle, with mechanism for imparting the necessary reciprocating motions to said needle and a complex reciprocating and oscillating or rotary motion to said shuttle, substantially as and for the purpose shown and set forth.

2. The case or standard $A^1$, having notched guide bracket or bearing I, in combination with the reciprocating shuttle-bar F, having pin or roller $k$, and provided with the shuttle-carrier M and oscillating shaft L, and mechanism for operating said bar and shaft, substantially as set forth.

3. The combination, with the vertically-slotted casing $A^1$, of the reciprocating shuttle-bar F, having the shuttle-carrier M, and provided with bearings for the parallel oscillating shaft L, and with mechanism for operating said bar F, substantially as set forth.

4. The combination of the reciprocating shuttle-bar F, constructed as described, with the oscillating shaft L, provided with the shuttle-driver $L'$, and mechanism for operating said shaft L, substantially as set forth.

5. The combination of the following operating elements, viz: shaft E, having cams 1 and 2, pivoted lever O, having roller $p$ and rack $n$, bar F, provided with the adjustable pin $i$, shaft L, having toothed cylinder or segment $l$, lever $g$, having the lug or tappet $h'$ and notches $g^1$ $g^2$, and coiled springs G H P, all constructed and arranged to operate substantially in the manner and for the purpose shown and set forth.

6. The combination of the shaft E, having cams 3, 4, and 5, reciprocating needle-bar R, having yoke Q, pivoted lever S, having take-up hook $S'$ and roller $r$, bell-crank lever U, having adjustable spring-pawl V, and coiled spring T, all constructed and arranged to operate substantially in the manner and for the purpose shown and set forth.

7. The combination, with the reciprocating needle, of the presser foot or arm B, constructed with the slotted shoe 8, having stepped heel 9, toe-pieces 10 10, and spring guide or cushion 7, substantially as and for the purpose shown and set forth.

8. The combination, with the reciprocating needle, presser-foot, and shuttle, constructed and operating substantially as described, of the spring guide or cushion 7, adapted to guide the point of the needle up against the shuttle, in the manner and for the purpose substantially as set forth.

9. The combination of the shuttle N, constructed and operating as described, with the reciprocating carrier M and oscillating driver $L'$, and mechanism for operating said carrier and driver, substantially as set forth.

10. The combination, as described, of the following co-operative elements with their operating mechanism, to wit: the feed-disks $v\ w$, reciprocating needle X, vibrating shuttle-carrier M, and shuttle-driver L', oscillating in a plane transverse to that in which the carrier vibrates, substantially as and for the purpose set forth.

In testimony whereof I have hereto set my hand and affixed my seal, in the presence of two subscribing witnesses, at the city of Paris, in the Republic of France, this 23d day of September, 1878.

HANS P. HENRIKSEN. [L. S.]

Witnesses:
L. GUDMANN,
J. J. HANSEN.